United States Patent
Dave et al.

(10) Patent No.: US 9,609,122 B2
(45) Date of Patent: Mar. 28, 2017

(54) IDENTIFYING INFORMATION ASSOCIATED WITH AN INCOMING TELEPHONE CALL

(71) Applicant: Apple Inc., Cupertino, CA (US)

(72) Inventors: Swapnil Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/866,281

(22) Filed: Sep. 25, 2015

(65) Prior Publication Data

US 2016/0014271 A1    Jan. 14, 2016

Related U.S. Application Data

(60) Continuation of application No. 14/170,802, filed on Feb. 3, 2014, now Pat. No. 9,148,507, which is a division of application No. 13/534,566, filed on Jun. 27, 2012, now abandoned.

(51) Int. Cl.

| | | |
|---|---|---|
| *H04M 1/64* | (2006.01) | |
| *H04M 3/42* | (2006.01) | |
| *H04M 1/2745* | (2006.01) | |
| *H04M 3/493* | (2006.01) | |
| *H04W 4/12* | (2009.01) | |
| *H04W 4/16* | (2009.01) | |
| *H04W 8/18* | (2009.01) | |

(52) U.S. Cl.
CPC . *H04M 3/42042* (2013.01); *H04M 1/274516* (2013.01); *H04M 3/4931* (2013.01); *H04W 4/12* (2013.01); *H04W 4/16* (2013.01); *H04W 8/183* (2013.01)

(58) Field of Classification Search
CPC ......... H04M 3/42042; H04M 3/42059; H04M 3/436
USPC .............................. 379/93.02, 93.17, 142.06
See application file for complete search history.

(56) References Cited

U.S. PATENT DOCUMENTS

| | | | |
|---|---|---|---|
| 6,192,116 B1 | 2/2001 | Mayak | |
| 6,310,944 B1 | 10/2001 | Brisebois | |
| 6,853,711 B2 * | 2/2005 | Brisebois | .......... H04M 3/42042 |
| | | | 379/142.06 |
| 6,977,993 B2 | 12/2005 | Starbuck | |
| 7,269,249 B2 * | 9/2007 | Woodring | ................ H04M 3/42 |
| | | | 379/142.05 |
| 2010/0086111 A1 * | 4/2010 | Gruchala | .......... H04M 3/42059 |
| | | | 379/93.17 |
| 2014/0003590 A1 | 1/2014 | Dave | |

* cited by examiner

*Primary Examiner* — Van D Huynh
(74) *Attorney, Agent, or Firm* — Blank Rome LLP (57) ABSTRACT

A telephone number corresponding to an incoming telephone call may be utilized to obtain information associated with the incoming call. If it is determined that the telephone number does not match records stored on the device on which the call is received, a request may be sent from the receiving device to an external device to obtain information associated with the incoming call. The request may be directed to a remote contacts application, another device listed in a data store of the receiving device, or to the calling device itself. When a response is received, the information may be displayed or otherwise utilized by the receiving device.

20 Claims, 8 Drawing Sheets

IDENTIFYING INFORMATION ASSOCIATED WITH AN INCOMING TELEPHONE CALL

CROSS-REFERENCE TO RELATED APPLICATIONS

This is a continuation application of U.S. patent application Ser. No. 14/170,802, by Swapnil Dave and Devrim Varoglu, entitled Identifying Information Associated with an Incoming Telephone Call, filed Feb. 3, 2014, which is a division of U.S. patent application Ser. No. 13/534,566, by Swapnil Dave and Devrim Varoglu, entitled Identifying Information Associated with an Incoming Telephone Call, filed Jun. 27, 2012, which is incorporated by reference herein in its entirety.

BACKGROUND

This disclosure relates generally to the identification of information associated with an incoming telephone call. More particularly, but not by way of limitation, this disclosure relates to techniques for utilizing a telephone number corresponding to an incoming call to obtain additional information associated with the call.

A contacts directory on an electronic device may be utilized to store information for individuals or organizations with whom a user of the device frequently interacts. This information may allow identification information for an individual listed in the contacts directory to be utilized upon receipt of an incoming communication from the individual. For example, it is common for a device to receive a telephone number associated with an incoming call. If the telephone number is stored in a contacts directory on the device, information associated with the telephone number, such as a name and/or other data or preferences associated with the telephone number in the contacts directory, may be displayed or otherwise utilized by the device upon receipt of the incoming phone call. However, if the telephone number is not stored in the contacts directory, no associated information will be available for display or other utilization by the device. It would be desirable to obtain information associated with an incoming call when the information is not available in a contacts directory of a device on which the incoming call is received.

SUMMARY

In one embodiment, the invention provides a method to identify information associated with an incoming telephone call. If it is determined by a first device that a telephone number associated with an incoming telephone call does not match a record on the first device, a request may be sent to an external device to identify information associated with the telephone number. The information may be received by the first device as a response from the external device. In one embodiment, some or all of the received information may be displayed on a display element of the first device. The method may be embodied in program code and stored on a non-transitory medium. The stored program code may be executed by a processor that is part of, or controls, a device that receives the incoming telephone call.

In another embodiment, the invention provides a method to send identifying information as part of the establishment of a telephone call. As part of the initiation of a telephone call to a recipient device, an initiating device may locate self-identifying information in a local data store. The self-identifying information may be sent by the initiating device to the recipient device at substantially the same time as the initiation of the phone call. The method may be embodied in program code and stored on a non-transitory medium. The stored program code may be executed by a processor that is part of, or controls, the initiating device.

DETAILED DESCRIPTION

This disclosure pertains to the retrieval of information associated with an incoming telephone call received at a device. In general, techniques are disclosed for receiving a telephone call at a first device from a second device, determining whether a telephone number for the second device is stored on the first device, and, if not, obtaining information associated with the telephone call. By way of example, information associated with an incoming telephone call may include a name and/or other contact information for a user of the second device.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of mobile device communications having the benefit of this disclosure.

Figure 1:
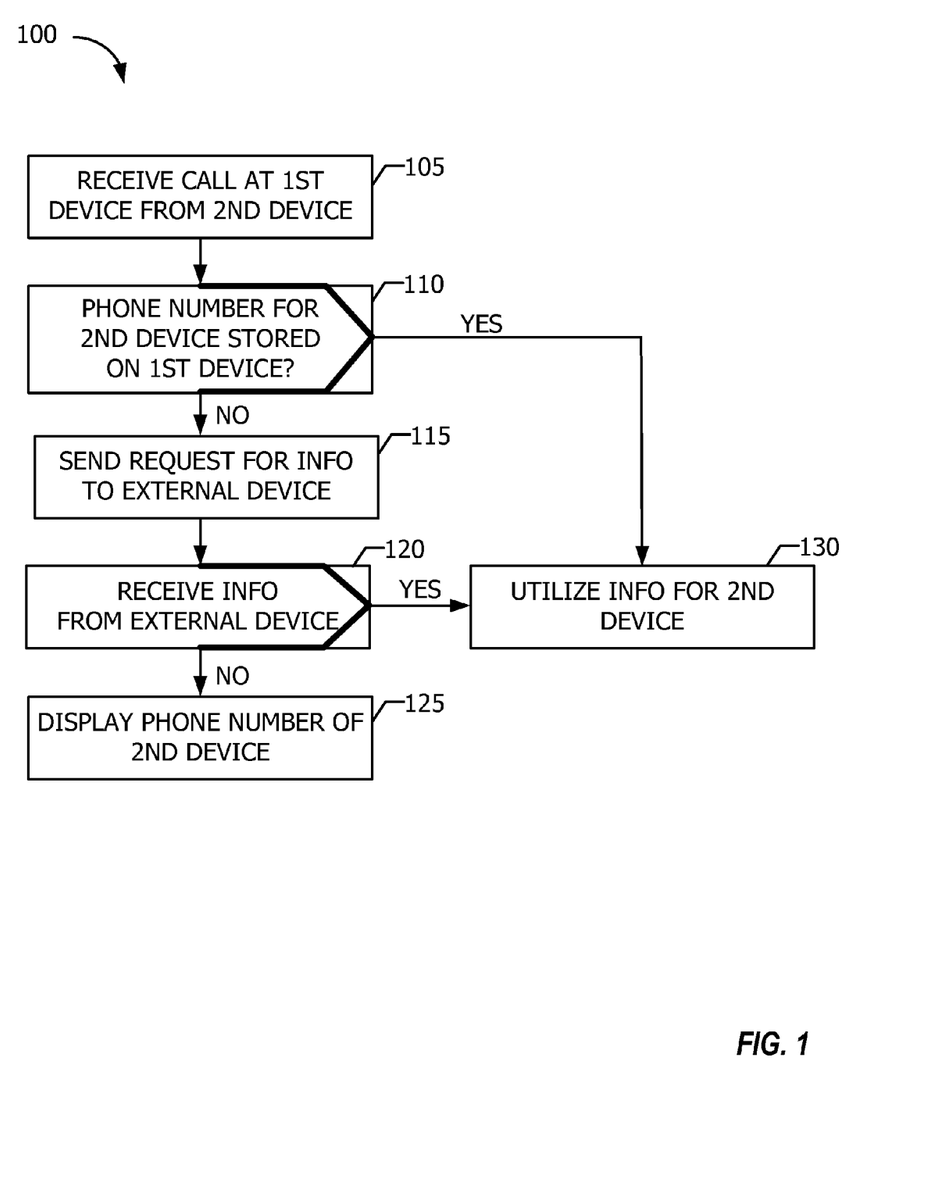
FIG. 1 is a flowchart that illustrates a process by which information associated with an incoming call may be retrieved from an external device in accordance with one embodiment.

Referring to FIG. 1, information identification process 100 may be initiated with the receipt of a telephone call at a first device from a second device (block 105). As is well known in the art, the telephone number of the second device may be transmitted to the first device in association with the call. In one embodiment, the second device's telephone number may be transmitted to the first device while the telephone call is being set up and before the call is answered. It may then be determined whether the received telephone number (i.e., the telephone number associated with the second device) matches a telephone number in a data store on the first device (block 110). A user of the first device may store contact information for individuals and businesses with whom they frequently interact in a contacts application on the first device. If the incoming telephone number matches a telephone number stored on the device (the "Yes" prong of block 110), information associated with the telephone number may be utilized by the first device (block 130). In one embodiment, a name associated with the telephone number may be displayed on the first device. For example, if the incoming telephone number matches a telephone number associated with a contact for "Mary Smith," the first device may indicate that the incoming call is from Mary Smith. In another embodiment, a data store on the first device may also associate a telephone number with other preferences. For example, different ring tones may be associated with different telephone numbers in the data store. Therefore, an incoming call from a telephone number matching an entry in the data store may trigger a ring tone associated with the telephone number, allowing the recipient of the call (i.e., the user of the first device) to identify the caller without even looking at the device. The data store may also define a manner in which the call should be handled by the device. For example, a user may not wish to receive calls during certain hours (e.g., during the night) and may therefore set the device to direct calls received during these hours to a voicemail application to allow the caller to leave a message without the phone ringing. The user may define certain exceptions to these types of rules based on the incoming telephone number. For example, the user may define an exception to allow the phone to ring for calls received from certain telephone numbers in the data store (e.g., telephone numbers associated with family members).

If it is determined that the received telephone number is not stored on the device (the "No" prong of block 110), the device will not have any information stored locally that can be displayed or otherwise utilized. Consequently, the first device may send a request to one or more external devices to retrieve information associated with the incoming telephone number. As will be described in greater detail below, the information may be retrieved from a variety of different external devices. In one embodiment, the information may be retrieved from a contacts application executing on a remote device. In another embodiment, the first device may select an external device based on contact information in a local data store on the first device. In still another embodiment, the user of the second device may provide his or her own contact information to a remote device such that it may be retrieved by the first device. In yet another embodiment, a request for information may be directed to the second device itself. If the requested information is received from the external device(s) (the "Yes" prong of block 120), the information may be utilized by the first device (block 130). The information may be utilized before, after, or both before and after the incoming call is answered. In one embodiment, the information may be displayed on the first device. In another embodiment, the information may be used in accordance with certain device preferences (e.g., such as those described above). In yet another embodiment, the information may be utilized to automatically create contact information in a local data store on the first device. If it is determined that no response containing the requested information has been received from the external device(s) (the "No" prong of block 120), the first device may display only the telephone number of the second device (block 125). In one embodiment, the display of an incoming telephone number may indicate that no information related to the incoming telephone number is available from an external device. For example, the incoming telephone number may be displayed in a particular style, color, or in conjunction with a symbol indicative of the unsuccessful attempt by the first device to retrieve information relating to the incoming phone number from one or more external devices.

Figure 2:
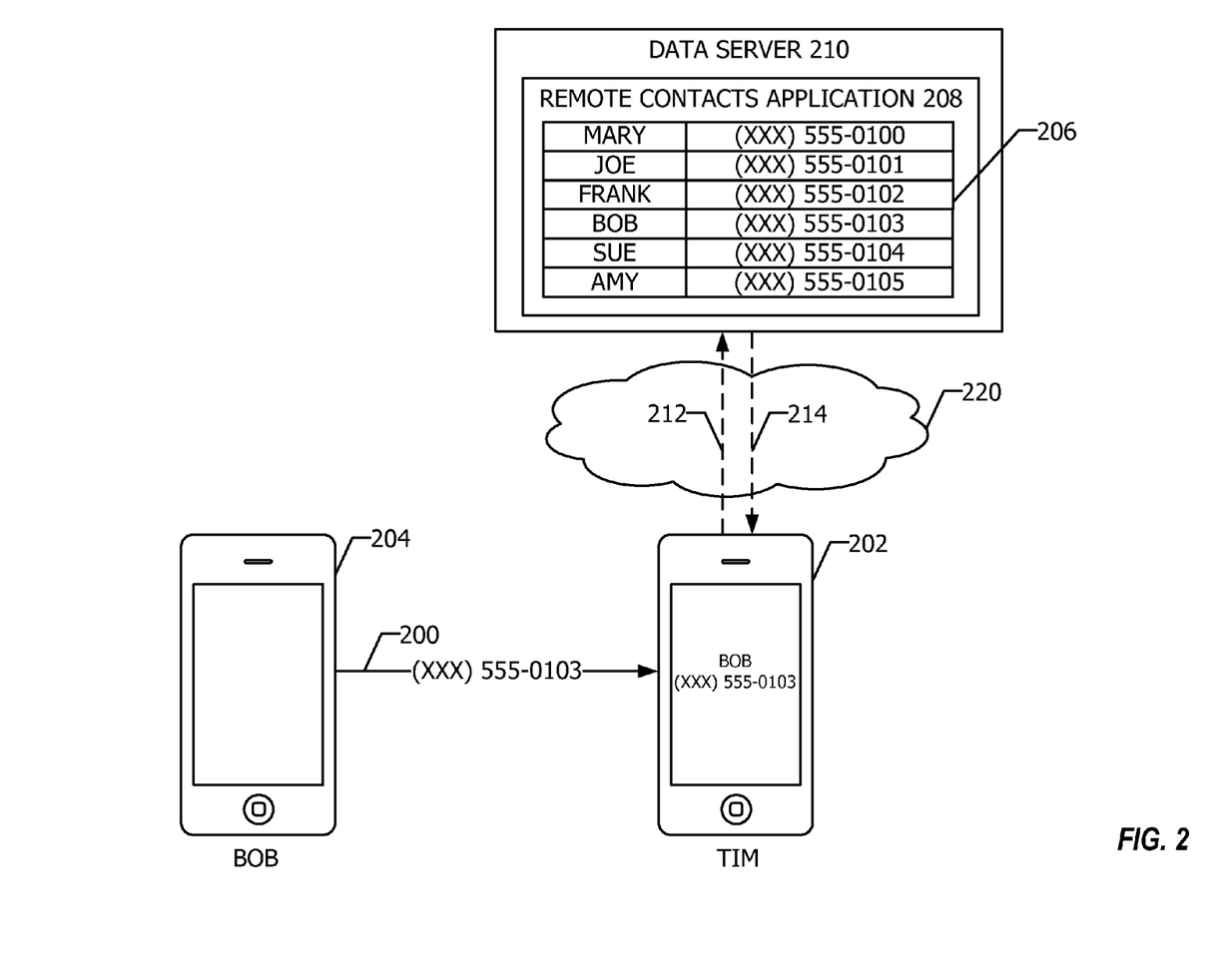
FIG. 2 is a block diagram illustrating the retrieval of information associated with an incoming call from a remote contacts application in accordance with one embodiment.

Referring to FIG. 2, in accordance with one embodiment, information pertaining to an incoming telephone call may be obtained from an application executing on a remote server. In the illustrated embodiment, phone call 200 to device 202 is initiated from device 204. As part of the call setup process, device 202 may also receive a telephone number for device 204. A local data store on device 202 may then be searched to locate a match for the received telephone number in order to identify information associated with the telephone number. If it is determined that the telephone number for device 204 does not match a telephone number in a local data store on device 202, request 212 may be sent to remote contacts application 208 executing on data server 210 over network 220. Network 220 may take any form including, but not limited to, a local area network (LAN), a wide area network (WAN) such as the Internet or a combination of local and wide-area networks. Moreover, the network may use any desired technology (wired, wireless or a combination thereof) and protocol (e.g., transmission control protocol, TCP). Remote contacts application 208 may maintain remote data store 206 that stores contact information for individuals with whom the user of device 202 interacts. In one embodiment, request 212 may include the received telephone number for device 204. In another embodiment, request 212 may include access credentials to allow access to the user's account with remote contacts application 208.

In one embodiment, remote contacts application 208 may be a feature of a synchronization service. A synchronization service may remotely maintain synchronization between applications on multiple devices associated with a user account. For example, updated contact information for another device belonging to the user of device 202 may be transmitted to remote contacts application 208 to be subsequently transmitted to or retrieved by device 202. Thus, data store 206 may include a telephone number that has been entered as a contact on another of the user's devices but has not yet been synchronized with a local contacts application on device 202. One example of a synchronization service is the Apple® iCloud™ service. (APPLE is a registered trademark of Apple Inc. ICLOUD is a trademark of Apple Inc.)

In another embodiment, remote contacts application 208 may be used in lieu of a local contacts application. In such an embodiment, request 212 may be routed to remote data server 210 for each call received by device 202. In one embodiment, remote contacts application may provide all of the functionality of a local contacts application. For example, remote contacts application 208 may enable a user to associate names, ringtones and other settings with telephone numbers. In one embodiment, remote contacts application 208 may allow a group of users to maintain a joint contacts list. For example, an organization that provides mobile phones to multiple employees may maintain a single list of contacts in remote contacts application 208 that each device may access remotely.

Upon receiving request 212, remote contacts application 208 may search data store 206 for a record matching the telephone number included in request 212 (i.e., the telephone number associated with device 204). If a matching record is located, information associated with the matching record may be transmitted to device 202 as response 214. In one embodiment, response 214 may include a name associated with the record matching the telephone number of device 204. For example, in the illustrated embodiment, response 214 may include the name "Bob" which is associated with the telephone number "(XXX) 555-0103" in data store 206. Although data store 206 only illustrates a name associated with a telephone number, it will be understood that data store 206 may maintain additional preferences. For example, data store 206 may include a media object (e.g., a ring tone or photograph) associated with a telephone number. In such an embodiment, the media object may be stored on device 202 and response 214 may contain a reference to the media object on device 202. In another embodiment, data store 206 may include a calling preference. For example, just as described above with respect to a local contacts application, a user may create an exception via remote contacts application 208 (e.g., for certain individuals identified in a contacts list) to a rule that calls during a certain time period should be directed to a voicemail application without ringing. The information received in response 214 may then be utilized by device 202. For example, a name associated with the telephone number for device 204 in data store 206 may be displayed on device 202.

Figure 3:
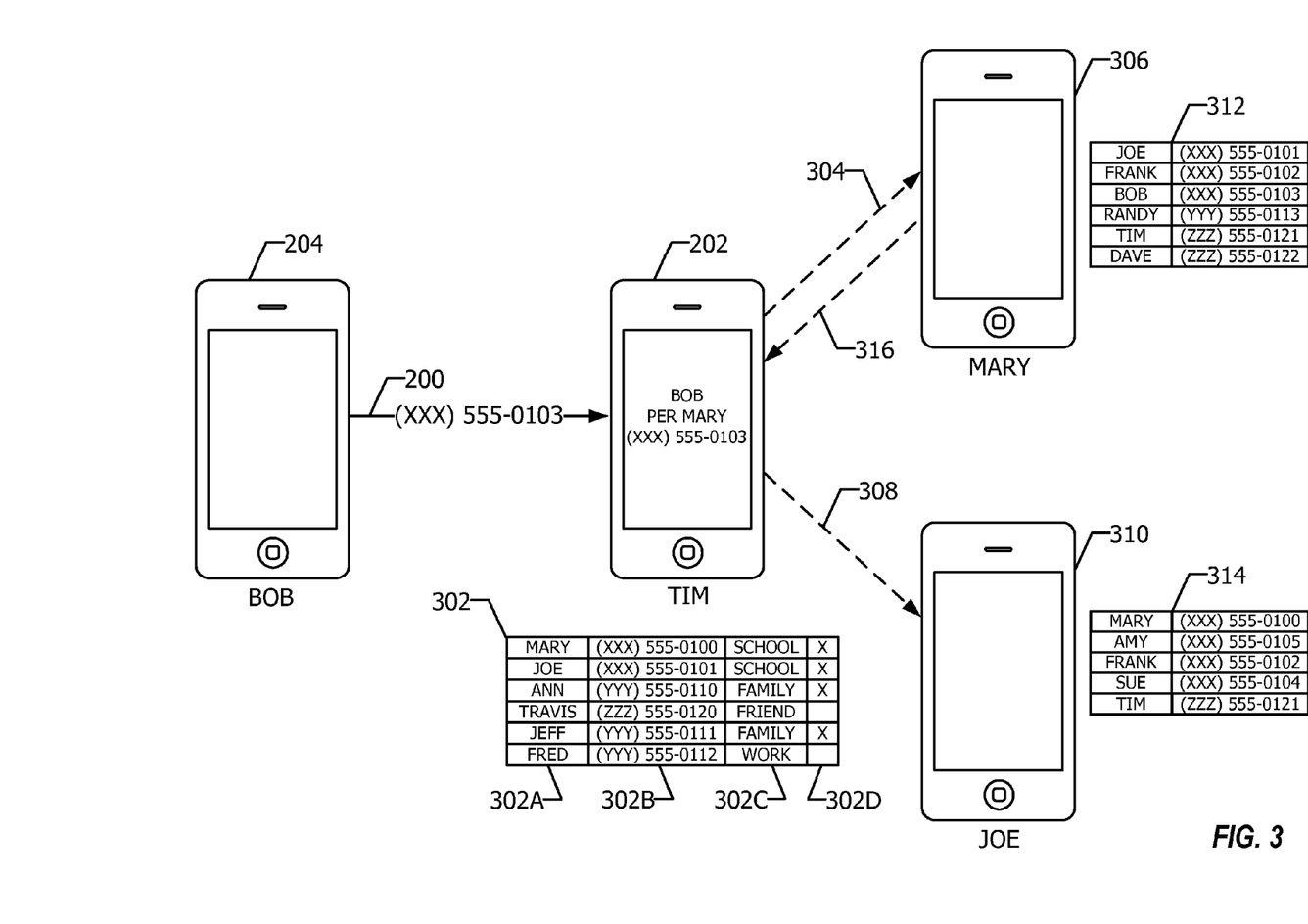
FIG. 3 is a block diagram illustrating the identification of one or more devices from which information associated with an incoming call may be obtained based on contact information on the device at which the call is received in accordance with one embodiment.

Referring to FIG. 3, in accordance with another embodiment device 202 may select one or more devices to which a request for information related to incoming telephone call 200 may be directed based on contact information in a data store on device 202. In the same manner as described above with respect to FIG. 2, phone call 200 to device 202 may be initiated from device 204, and device 202 may receive a telephone number associated with device 204. Device 202 may search through local data store 302 to identify a match for the telephone number (e.g., within telephone number field 302B) associated with incoming call 200. It will be understood that data store 302 may associate contact information for one or more devices and/or accounts with a particular individual (e.g., an individual within contact field 302A). For example, data store 302 may associate an individual with one or more telephone numbers, one or more email addresses, one or more social network accounts, etc. Data store 302 may also include a record for a type of relationship within type field 302C. For example, contact information for an individual may be assigned to a friend category, a work category, a school category, etc.

Upon determining that the telephone number for the incoming call does not match any records in data store 302, contact information from data store 302 may be used to identify one or more devices that may be able to provide information related to the telephone number associated with incoming call 200. In one embodiment, a telephone number may be used to identify a device to which a request for the desired information may be directed. As is known, a telephone number may uniquely identify a single device. In another embodiment, data store 302 may include other contact information that allows a device to be identified. For example, an email address associated with an individual listed in data store 302 may be linked to a particular device by records maintained at a remote server. Accordingly, an email address or other identifier stored in data store 302 may be used to direct a request to an appropriate device. Consequently, a device to which a request for information may be directed need not be a telephone. Rather, the device may be any type of device that may potentially maintain contact information related to incoming telephone call 200 such as a tablet computer device, a laptop computer device, a desktop computer device, a contacts database, a contacts service provider, etc.

In one embodiment, only certain devices in data store 302 may be designated as amenable to accepting a request for information pertaining to an incoming call. In one embodiment, the devices may be identified based on a setting in data store 302 (e.g., a setting listed in designation field 302D). In one embodiment, a user may be required to consent before their device may be listed as one of the designated devices. For example, a request for permission to retrieve information pertaining to subsequent incoming calls may be sent to a device, and the data store setting may only be set if an affirmative response is received. In another embodiment, designating a device in data store 302 as a device from which information may be retrieved may represent an agreement to reciprocate. For example, by designating a particular device, a user may implicitly agree to accept and respond to requests generated by that device.

From the group of designated devices, the particular device(s) to which a request for information should be sent may be determined in a variety of manners. In one embodiment, a ranking may be assigned to the designated devices. In such an embodiment, a request for information pertaining to an incoming call may be directed to the designated devices in order of ranking. Thus, a request may be transmitted to a designated device having a higher ranking prior to submitting the request to a device with a lower ranking. In another embodiment, a user may rank designated devices by the type of contact. For example, a request for information pertaining to an incoming call may be transmitted to a designated device associated with a "Family" contact before sending the request to a designated device associated with a "Work" contact. In one embodiment, requests may be sent to designated devices in succession until a response with the requested information is received. Because the requested information may be needed quickly (e.g., prior to the incoming call being answered), device 202 may proceed through the list of designated devices in rapid succession utilizing a short timeout period for each request. In another embodiment, the number of devices to which the request is sent may also be limited. For example, the request may only be sent to three designated devices before device 202 gives up and displays only the telephone number associated with an incoming call. In still another embodiment, device 202 may send out multiple requests to designated devices at the same time; using the information that is returned first.

In another embodiment, a device to which a request should be sent may be determined based on a relationship between the telephone number for the incoming call and the contact information. For example, in the illustrated embodiment, because incoming call 200 is associated with a telephone number having a "(XXX)" area code, it may be determined that a request for information pertaining to incoming call 200 should be directed to designated devices having the same area code because those devices may be more likely to contain the desired information. Therefore, request 304 may be directed to device 306 (i.e., Mary's device) and request 308 may be directed to device 310 (i.e., Joe's device). The requests may be transmitted (and a reply received) via any available network(s) (using any protocol) that allows the sending and receiving devices to communicate. In one embodiment, requests 304 and 308 may be sent simultaneously. In another embodiment, requests 304 and 308 may be sent in succession. Each of requests 304 and 308 may include the telephone number associated with incoming call 200. In response to receiving requests 304 and 308, devices 306 and 310 may search through a telephone number field in their contact data stores (312 and 314, respectively) for the telephone number included in the request.

In the illustrated embodiment, the telephone number for device 204 (i.e., "(XXX) 555-0103") is located in data store 312 on device 306. Therefore, device 306 may send response 316 to device 202 with information associated with the located telephone number. In one embodiment, response 316 may include a name associated with the telephone number in data store 312. In another embodiment, response 316 may include any other information (e.g., email address, employer, title, etc.) associated with the telephone number in data store 312. In one embodiment, a request from an originating device (e.g., requests 304 and 308 from device 202) may indicate the type of information that should be included in a reply. For example, device 202 may only want name information associated with the incoming telephone number and may not desire any other properties associated with the incoming telephone number on the other devices. As such, a request may indicate that only name information should be provided.

In one embodiment, the receipt of and response to a request for information by a device may be transparent to a user of the device. For example, a user of device 306 may be unaware that their device received and responded to a request for information related to device 204. In one embodiment, a device may receive and respond to a request even when it is not in active use. In another embodiment, a user of a device may be made aware of the information that has been provided in a response. For example device 306 may display an alert indicating that "Information for Bob was provided to Tim."

In one embodiment, a record may be listed as private in a local data store such as data store 312. In such an embodiment, information associated with the record may not be shared in a response to a request for information pertaining to an incoming call. For example if the contact for "Bob" was listed as private in data store 312, the information associated with the contact may not be provided in response 316 even though it may correspond to a telephone number included in request 304.

In the illustrated embodiment, the telephone number for device 204 is not included in data store 314 on device 310. Therefore, device 310 may not send any response to request 308. In another embodiment, device 310 may send a response indicating that no information related to request 308 is available. In yet another embodiment, upon receiving the desired information in response 316, device 202 may send an indication to device 310 that the information has been obtained and no response is necessary.

The information received in response 316 may be displayed or otherwise utilized by device 202. For example, the name information received in response 316 may be displayed on device 202. In the illustrated embodiment, the name information received in response 316 is attributed to the name information from data store 302 for the device that provided response 316 (i.e., device 306). Therefore, device 202 may display the name information associated with incoming telephone call 200 from device 204 as "Bob per Mary." This type of display may provide context to the received name information. For example, if a response provides name information associated with an incoming telephone call as "Mom," the information may be more understandable if it is presented as "Mom per Mary."

Figure 4:
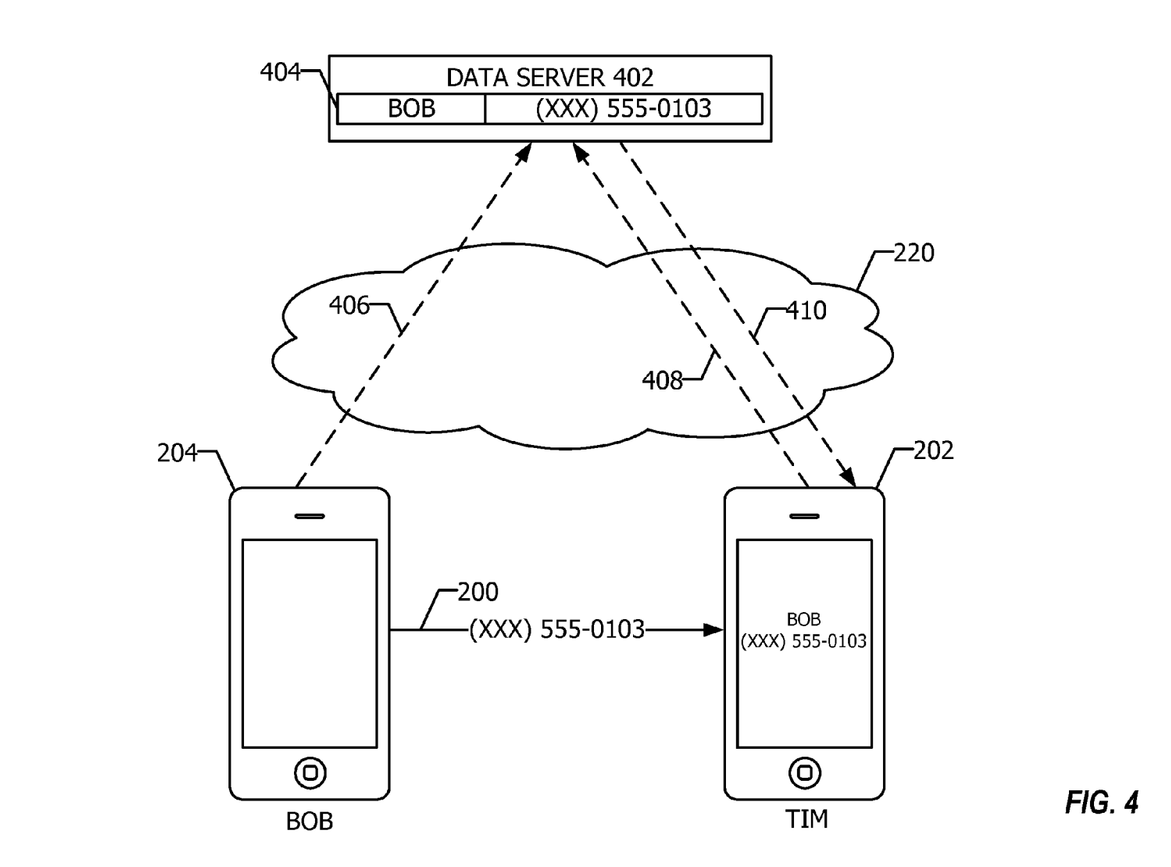
FIG. 4 is a block diagram illustrating the provision of information by a first device to a remote device and the subsequent retrieval of the information by a second device based on an incoming call from the first device in accordance with one embodiment.

Referring to FIG. 4, in accordance with another embodiment, a user may provide their contact information to a remote repository and allow it to be shared with other users whom they call. In the same manner as described above with respect to FIGS. 2 and 3, phone call 200 to device 202 may be initiated from device 204, and device 202 may receive a telephone number associated with device 204. Prior to initiating phone call 200, the user of device 204 may transmit their contact information to data server 402 via network 220 to be stored in contact repository 404 (406). In one embodiment, the contact information may be transmitted to data server 402 based on a setting on device 204. In such an embodiment, a special "Me" contact on device 204 may be transmitted to data server 402 when the setting is enabled and may be re-transmitted any time contact information for the "Me" contact is updated. In one embodiment, data server 402 may be controlled by a manufacturer of device 204. Although FIG. 4 only illustrates contact information for device 204 in contact repository 404, it will be understood that contact repository 404 may include information for all devices that have provided their contact information to data server 402 (e.g., all devices that have enabled a setting to share their contact information with people whom they call).

If device 202 determines that there is no match in a local data store for the telephone number corresponding to incoming call 200 from device 204, request 408 may be sent to data server 402. Like the requests described in FIGS. 2 and 3, request 408 may include the telephone number corresponding to incoming telephone call 200. In one embodiment, request 408 may include evidence of incoming call 200 such that contact information may only be shared with devices to which a call has been placed. Because the user of device 204 has provided their contact information to data server 402, contact repository 404 may include information associated with the telephone number for device 204. Consequently, the information associated with device 204 may be identified by searching contact repository 404 for the telephone number included in request 408. The information may therefore be provided to device 402 in response 410. Although FIG. 4 only illustrates a name associated with a user of device 204, it will be understood that other information (e.g., email addresses, employer information, title, etc.) may be associated with device 204 in contact repository 404. Device 202 may display or otherwise utilize the information received in response 410.

Figure 5:
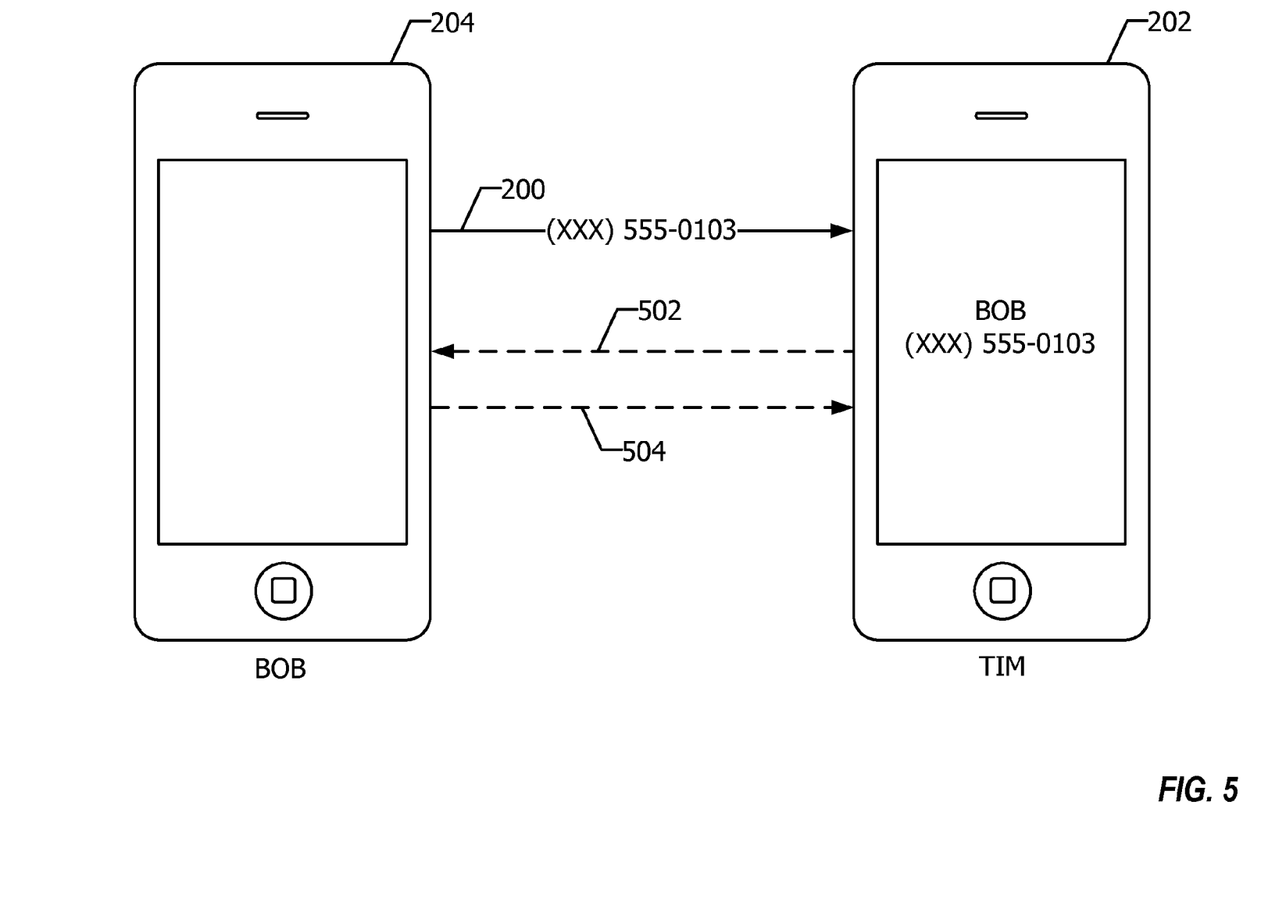
FIG. 5 is a block diagram illustrating the retrieval of information associated with an incoming call from the calling device in accordance with one embodiment.

Referring to FIG. 5, in accordance with another embodiment, a device receiving an incoming call may utilize the telephone number associated with the incoming call to obtain information directly from the calling device. In the same manner as described above with respect to FIGS. 2 through 4, phone call 200 to device 202 may be initiated from device 204, and device 202 may receive a telephone number associated with device 204. In response to receiving the telephone number associated with incoming call 200, device 202 may, after determining its local data store does not include information associated with incoming call 200's telephone number, send request 502 directly to the calling device (i.e., device 204). Request 502 may be transmitted (and a reply received) via any available network(s) (using any protocol) that allows device 202 and device 204 to communicate. Request 502 may invite device 204 to provide self-identifying information. In one embodiment, request 502 may invite device 204 to provide information associated with a "Me" contact from a data store on device 204. After locating the requested information, device 204 may send response 504 to device 202 with the requested information, which may be displayed or otherwise utilized on device 202. For example, device 202 may display a name associated with the self-identifying information received in response 504.

Figure 6:
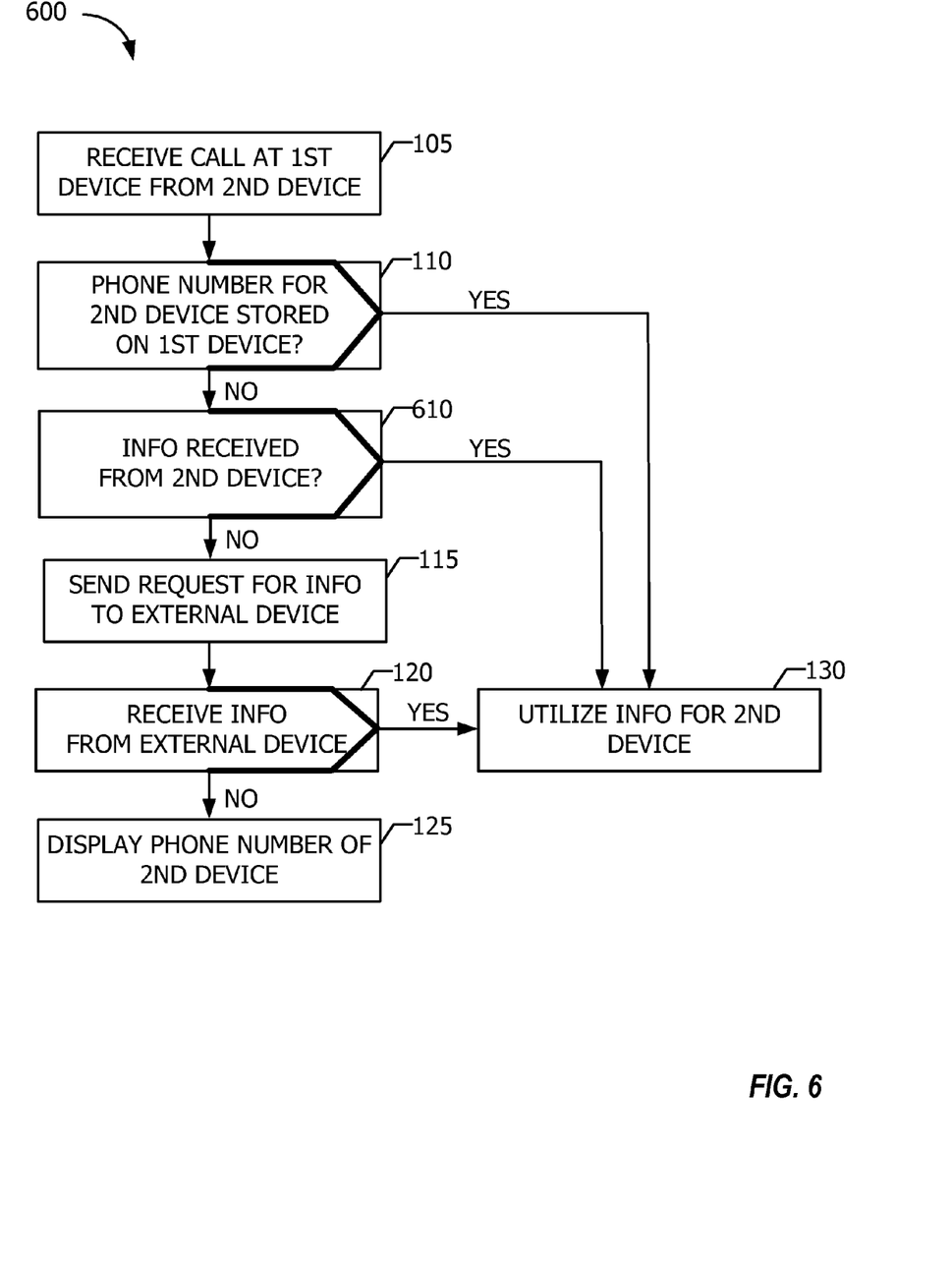
FIG. 6 is a flowchart that illustrates a process by which information associated with an incoming call may be retrieved from a local data store, from information provided by the calling device, or from an external device in accordance with one embodiment.

Referring to FIG. 6, information identification process 600 differs from process 100 in that after determining that a phone number associated with an incoming call is not stored on the first device (the "No" prong of block 110), rather than immediately sending a request for information to an external device (block 115), it may be determined if the information has already been received from the second device (e.g., received in addition to the received telephone number) (block 610). If it is determined that information has already been received from the second device (the "Yes" prong of block 610), it is not necessary to request the information from an external device. Instead, the received information may be directly utilized by the first device (block 130). If it is determined that no information has been received by the first device (the "No" prong of block 610), a request for information associated with the incoming telephone call may be sent to an external device (block 115) and the process may continue as described above with respect to process 100.

Figure 7:
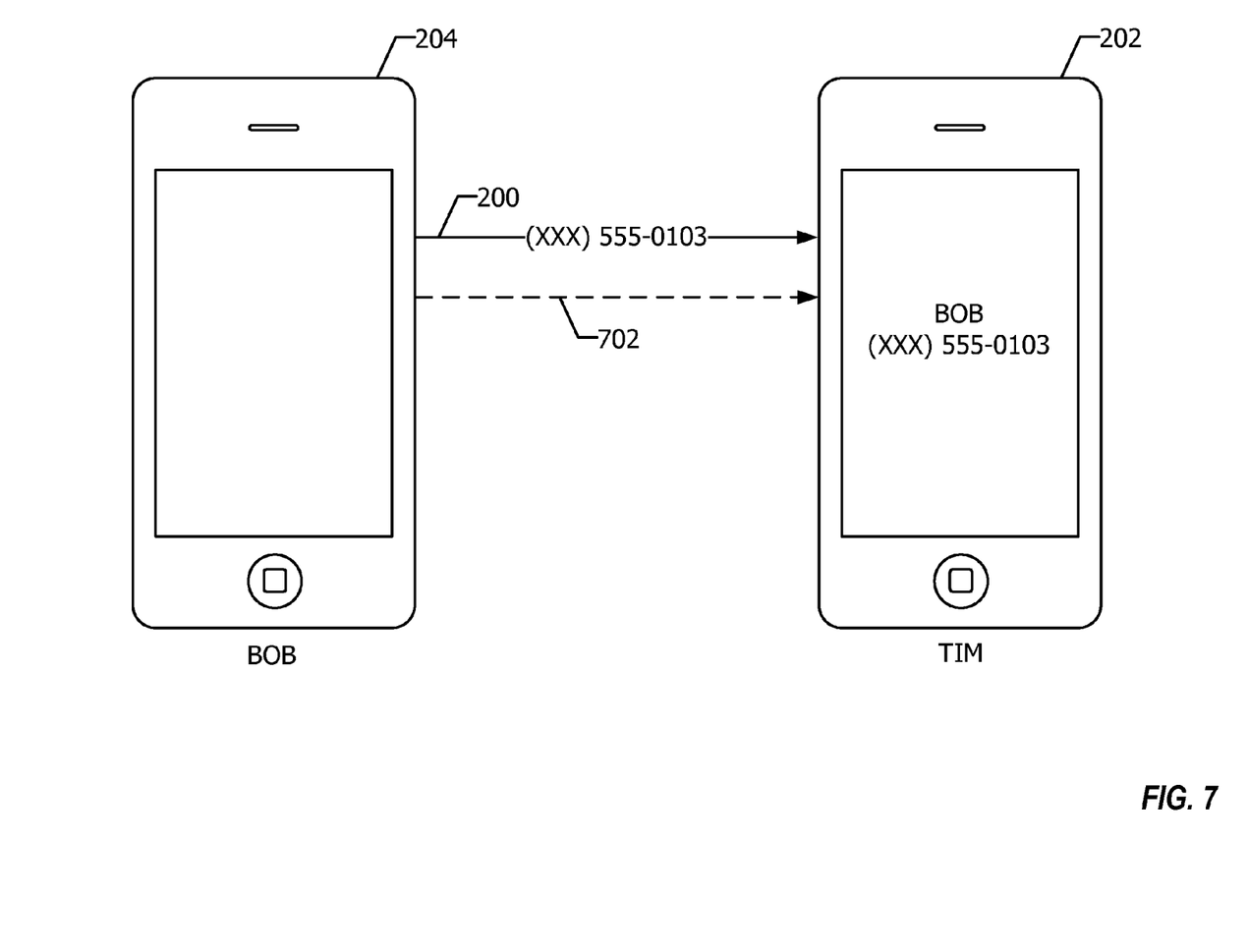
FIG. 7 is a block diagram illustrating the provision of information associated with an incoming call by a calling device in accordance with one embodiment.

Referring to FIG. 7, in accordance with another embodiment, a device receiving an incoming call may receive information directly from the calling device. In a similar manner to that described above with respect to FIG. 5, device 204 may send self-identifying information to device 202. However, in the embodiment illustrated in FIG. 7, self-identifying information may be transmitted from device 204 without receiving a request from device 202 (702). For example, each time device 204 initiates a phone call, self-identifying information (e.g., name of the user of device 204, email address associated with the user of device 204, employer of the user of device 204, etc.) may be located in a data store on device 204 and sent to the called device substantially contemporaneously with the initiation of the phone call. In one embodiment, device 204 may transmit information associated with a "Me" contact to device 202 as part of the calling process. In another embodiment, device 204 may include a setting to transmit self-identifying information for any call that is dialed. In yet another embodiment, self-identifying information may only be sent when a call is placed to a telephone number listed in a local data store on device 204. In still another embodiment, self-identifying information may only be sent when a call is placed to a telephone number listed in a local data store on device 204 that has been "tagged" with an indication that such information is to be sent. In one embodiment, such "tags" may be associated with individual entries in a local data store on device 204. In another embodiment, the "tags" may be associated with designated groups of contacts (e.g., family). The self-identifying information may be routed with or separate from the call setup data and may be transmitted via any available network(s) (using any protocol) that allows device 202 and device 204 to communicate. In accordance with the embodiment illustrated in FIG. 7, device 202 may be able to utilize information associated with device 204 even when no telephone number for device 204 is stored on device 202 and without requesting the information from an external device (as described above with respect to process 600).

Figure 8:
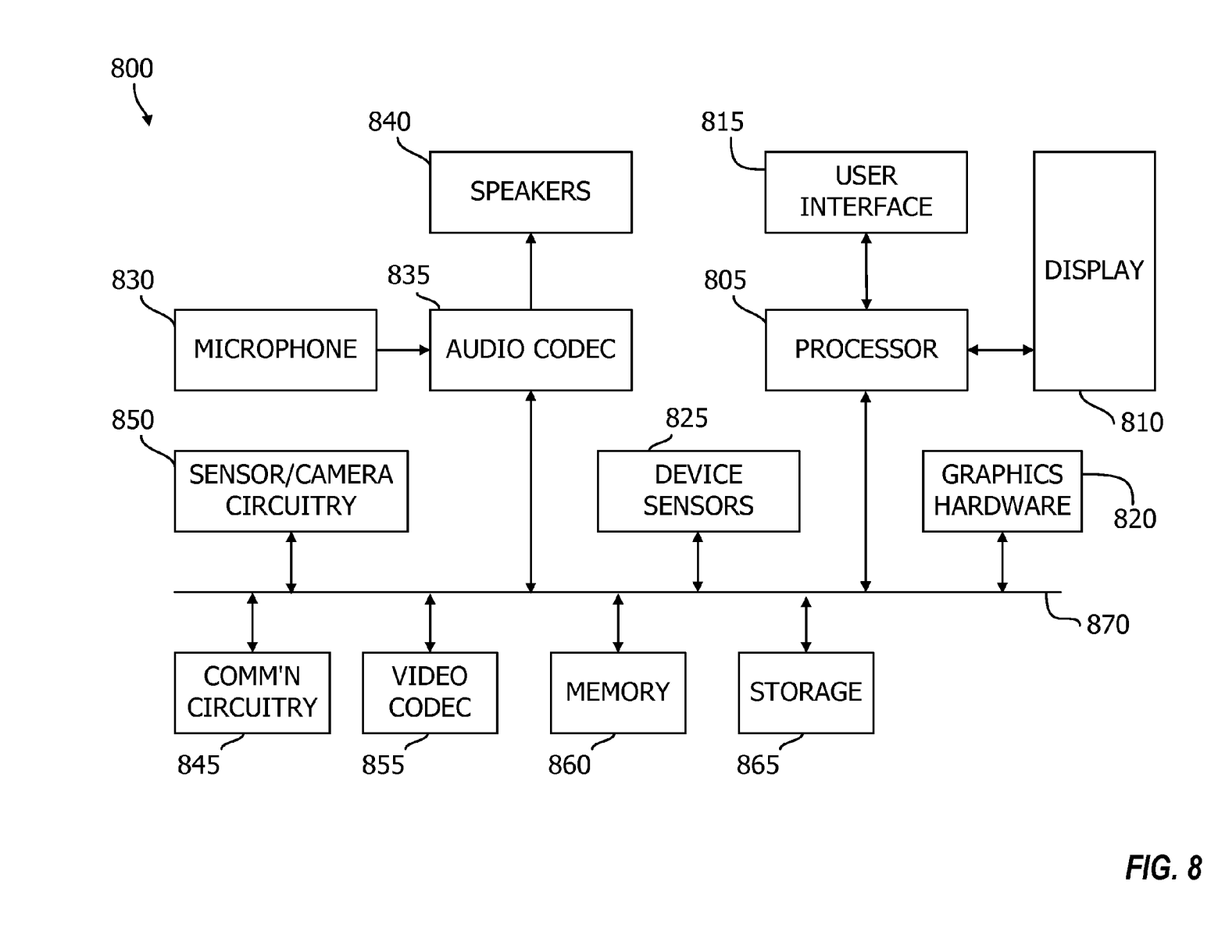
FIG. 8 is a block diagram of an illustrative electronic device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, mobile telephone, notebook, laptop or a tablet computer, desktop computer, or server computer. More particularly, any of the devices described above (e.g., devices 202, 204, 306, and 310 and data servers 210 and 402) may take the form of device 800.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable graphics processing unit (GPU).

Sensor and camera circuitry 850 may capture still and video images that may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. At least one non-transitory program storage device, readable by at least one processor and comprising instructions stored thereon to cause the at least one processor to:
   receive, by a first device, a communication from a second device having an associated identifier;
   determine, by the first device, a portion of the associated identifier, wherein the portion of the associated identifier is different from the associated identifier and the associated identifier is one of a phone number or an email address;
   identify, by the first device, at least one identifier among a plurality of identifiers stored in the first device, wherein a portion of the at least one identifier matches the portion of the associated identifier;
   select, by the first device, a third device corresponding to the at least one identifier;
   contact, by the first device, the third device using the at least one identifier to request additional information associated with the second device;
   receive, by the first device, the additional information from the third device; and
   display, by the first device, at least a portion of the additional information.

2. The at least one non-transitory program storage device of claim 1, wherein the associated identifier is a phone number and the additional information comprises at least one of a name of a user of the second device, an email address associated with the user of the second device, and an employer of the user of the second device.

3. The at least one non-transitory program storage device of claim 1, wherein the additional information comprises a media object.

4. The at least one non-transitory program storage device of claim 1, wherein the additional information comprises a calling preference.

5. The at least one non-transitory program storage device of claim 1, further comprising instructions to:
   display an indication that no information related to the associated identifier is available.

6. The at least one non-transitory program storage device of claim 1, further comprising instructions to:
   request directly to the second device, by the first device, for self-identifying information.

7. The at least one non-transitory program storage device of claim 1, further comprising instructions to:
   update a local data store on the first device with the additional information obtained from the third device.

8. The at least one non-transitory program storage device of claim 7, wherein the local data store is a contact directory.

9. A method comprising:
   receiving, by a first device, a communication from a second device having an associated identifier;
   determining, by the first device, a portion of the associated identifier, wherein the portion of the associated identifier is different from the associated identifier and the associated identifier is one of a phone number or an email address;
   identifying, by the first device, at least one identifier among a plurality of identifiers stored in the first device, wherein a portion of the at least one identifier matches the portion of the associated identifier;
   selecting, by the first device, a third device corresponding to the at least one identifier;
   contacting, by the first device, the third device using the at least one identifier to request additional information associated with the second device;
   receiving, by the first device, the additional information from the third device; and
   displaying, by the first device, at least a portion of the additional information.

10. The method of claim 9, wherein the associated identifier is a phone number and the additional information comprises at least one of a name of a user of the second device, an email address associated with the user of the second device, and an employer of the user of the second device.

11. The method of claim 9, wherein the additional information comprises a media object.

12. The method of claim 9, wherein the additional information comprises a calling preference.

13. The method of claim 9, further comprising:
    displaying, by the first device, an indication that no information related to the associated identifier is available.

14. The method of claim 9, further comprising:
    requesting directly to the second device, by the first device, for self-identifying information.

15. A system, comprising:
    at least one processor;
    a memory to store telephone number information in communication with the at least one processor; and
    a storage medium having instructions stored thereon to cause the at least one processor to:
      receive, by a first device, a communication from a second device having an associated identifier;
      determine, by the first device, a portion of the associated identifier, wherein the portion of the associated identifier is different from the associated identifier, the associated identifier is one of a phone number or an email address;
      identify, by the first device, at least one identifier among a plurality of identifiers stored in the first device, wherein a portion of the at least one identifier matches the portion of the associated identifier;
      select, by the first device, a third device corresponding to the at least one identifier;
      contact, by the first device, the third device using the at least one identifier to request additional information associated with the second device;
      receive, by the first device, the additional information from the third device; and display, by the first device, at least a portion of the additional information.

16. The system of claim 15, wherein the associated identifier is a phone number and the additional information comprises at least one of a name of a user of the second device, an email address associated with the user of the second device, and an employer of the user of the second device.

17. The system of claim 15, wherein the additional information comprises a media object.

18. The system of claim 15, wherein the additional information comprises a calling preference.

19. The system of claim 15, further comprising instructions to:
   display an indication that no information related to the associated identifier is available.

20. The system of claim 15, further comprising instructions to:
   request directly to the second device, by the first device, for self-identifying information.

* * * * *